United States Patent [19]
Lonnecker

[11] Patent Number: 4,651,420
[45] Date of Patent: Mar. 24, 1987

[54] UNIVERSAL VEGETATION CUTTER OR UVC

[76] Inventor: Joseph C. A. Lonnecker, 4716 Troost, Kansas City, Mo. 64110

[21] Appl. No.: 865,963

[22] Filed: May 22, 1986

[51] Int. Cl.$^4$ .................. B26B 19/06; B27B 19/04
[52] U.S. Cl. .......................... 30/296 R; 30/166 R; 30/210
[58] Field of Search .............. 30/296 R, 123, 124, 30/166 R, 210, 277; 144/2

[56] References Cited

U.S. PATENT DOCUMENTS

| | | | |
|---|---|---|---|
| 2,697,457 | 12/1954 | Lawrence | 30/296 R |
| 3,219,129 | 11/1965 | Yamada | 30/296 R |
| 3,340,612 | 9/1967 | Knight | 30/166 R |
| 3,346,955 | 10/1967 | Beneke | 30/296 R |
| 4,122,601 | 10/1978 | Katsuya | 30/166 R |
| 4,145,810 | 3/1979 | Belliston | 30/296 R |
| 4,347,880 | 9/1982 | van der Merwe | 30/296 R |
| 4,360,971 | 11/1982 | Fellmann | 30/296 R |
| 4,452,316 | 6/1984 | Edwards | 30/277 |
| 4,483,070 | 11/1984 | Junkermann | 30/296 R |

Primary Examiner—Jimmy C. Peters

[57] ABSTRACT

A cutter of standing vegetation having a boom to which is connected at one end a hinge from which projects a reciprocating type sickle, and is suspended centrally from a pivoting handle to which is connected a control rod which runs parallel to the greater length of the boom and is connected in a pivoting fashion to a control lobe which is connected at right angles to the nonmoving part of the sickle. A motor and gearbox assembly which produces reciprocating motion mounted at the other end of the boom, having a reciprocating power-take-off to which is clamped a reciprocating flexible drive shaft which runs to and is clamped upon the moving part of the sickle and is supported, braced, and channeled, by a flexible covering which terminates in two extension points, one of which is near the reciprocating power takeoff, the other of which is near the moving part of the sickle, which terminates in another reciprocating power-take-off to which a detachable saw blade is mounted.

6 Claims, 11 Drawing Figures

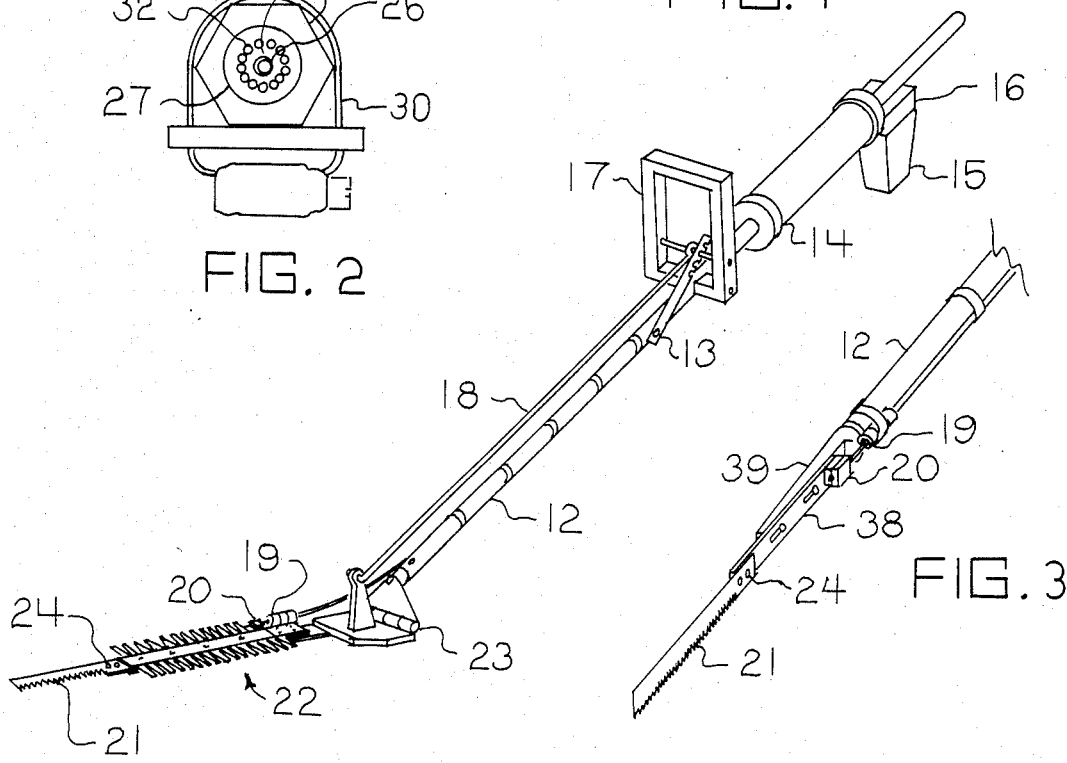

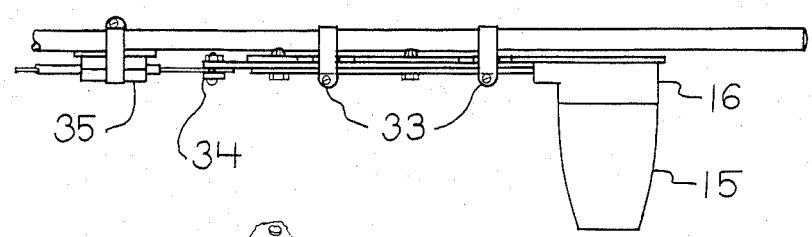
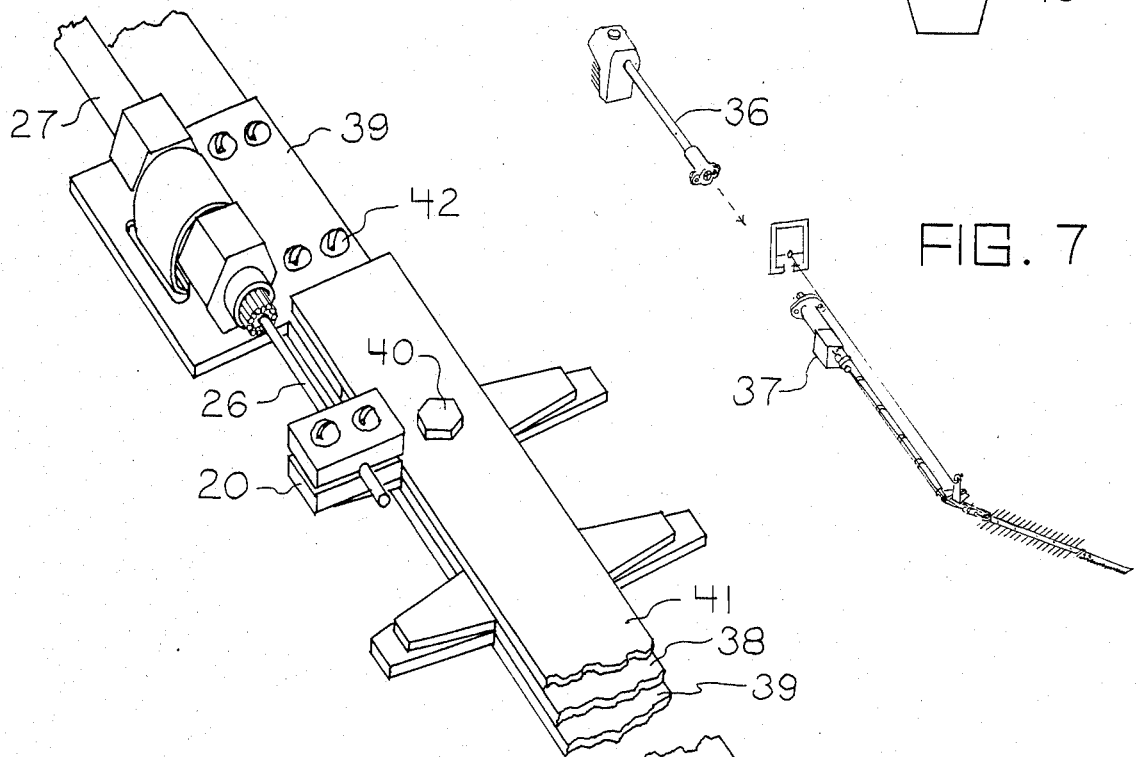
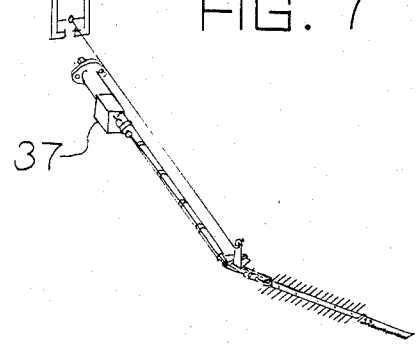
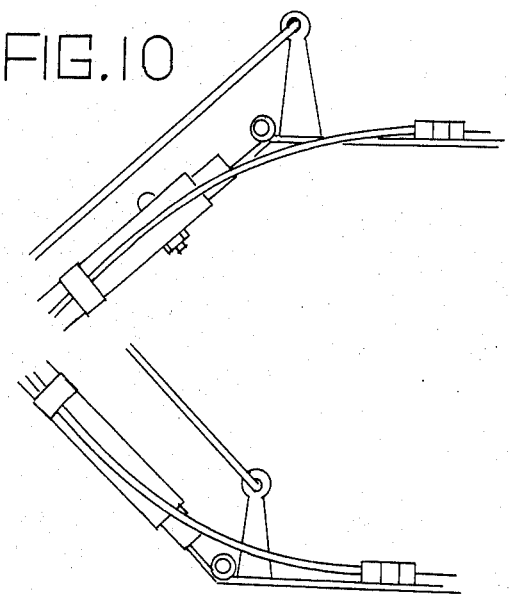
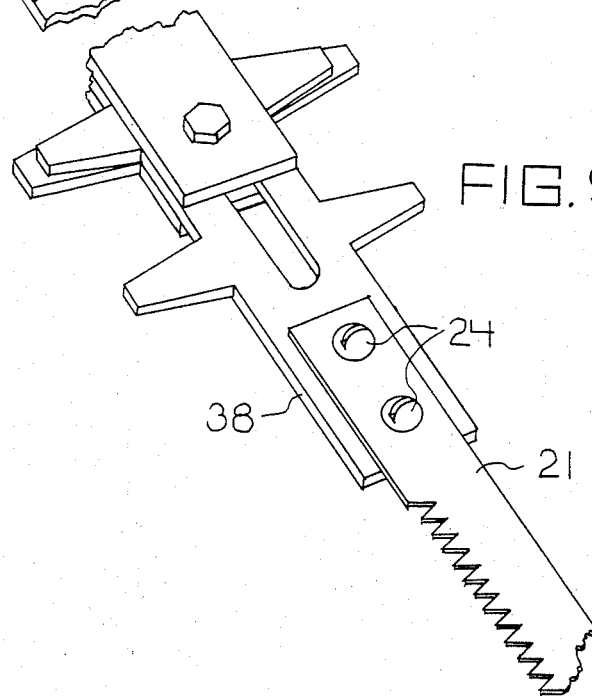

UNIVERSAL VEGETATION CUTTER OR UVC

PREAMBLE

The UVC is the composite of three basic sub-inventions: a self-leveling tilt control mechanism for the working end, a novel means of delivering power around the tilt control mechanism, and a combination working end, equally capable of sawing wood and cutting small stem vegetation.

The UVC can be constructed in a variety of weights and powers so that it may be used in residential settings or in larger commercial applications. It can be manipulated to cut in a highly ornamental fashion, or used in a strictly utilitarian manner such as cutting weeds on rough terrain.

The UVC has an infinite number of working positions. The most apt to be used are: lowest horizontal position to mow grass and cut weeds; waist high horizontal or straight position for topping medium hedges; high horizontal position for topping high hedges; straight rotated position for pruning trees; and angled and rotated position for sides of hedges.

The UVC allows yard work to be performed more safely than with previous inventions. Hands are kept a safe distance from cutting members. The power cord, if required, also is kept relatively clear of sickle. Its long reach makes the climbing of ladders unnecessary in most cases. For the control of vegetation on steep slopes, the UVC has no rival in terms of safety.

Although slower than a rotary lawnmower, it is lighter and easier to carry and store. Thus it may be the only mower required for a small and/or steep lawn.

A popular lawn trimmer is the string trimmer. The UVC will do much of the work of this tool as it gets around obstacles and into tight corners.

Another popular tool is the electric or gas powered hedge trimmer. While possessing a reciprocating sickle-type blade not unlike that of the UVC, these tools lack a boom extension. When one does extend the tool with one's arms, the weight of the power plant must also be extended putting undue stress on the human physique.

Another popular tool is the chain saw. Like the hedge trimmer its reach is limited. One may use the saw attachment of the UVC to cut branches well above the head of the operator. The saw attachment may also be used to ferret out unwanted saplings from hedges and bushes.

A lesser known tool is the underwater cutting attachment for a string trimmer type power plant. This tool has a reciprocating sickle type working end on a boom extension but has no tilt capability and thus is frozen in lowest horizontal position. The UVC will cut underwater as this tool does, to remove seaweed from around docks, beaches, and water hazards.

Now that I have discussed the uses of the UVC I will describe the principles that make it possible.

The UVC is basically a lever, the fulcrum of which is also its center of gravity. It is suspended from a piloting handle at this point.

Mounted on this 'see-saw' are on one end a powerplant, and on the other, the working end. Since the power plant is heavier its end is shorter.

The working end is mounted on a hinge so that it may pivot within a plane. A control lobe projects at right angles from a place near the hinge on the working end.

At a point approximately equal in height to the control lobe, a control rod joins the handle and extends therefrom to the control lobe.

The shape formed by the four elements (control rod, control lobe, boom segment, and handle segment) is an approximate parallelogram, the angles of which all pivot.

The handle tends to stay vertical since it is the element of suspension for the entire device. The control lobe also stays vertical since it is opposite the handle segment in the parallelogram. Since the control lobe is at right angles to the working end, the working end tends to stay level since level is at right angles to vertical. Thus the working end is self leveling regardless of boom angle to ground. This tendency may be overridden by operator at will. It is also helpful if a locking device is employed to freeze the tilt control in various positions.

The distance between the power plant and working end shall be linked all or in part by a reciprocating drive train, employing a reciprocating flexible driveshaft. A reciprocating drive shaft, properly braced, is inherently lighter and much smaller in diameter than a rotating drive shaft since the lines of force in reciprocation are straighter than those of rotation which are helical.

This reciprocating flexible drive shaft shall be guided and channeled between extension points near the reciprocating power take-off on the power end and a place near a similar clamping device on the moving part of the working end.

This shaft shall be non compressible for it shall deliver power in a compression stroke as well as in a tension stroke. Previous inventions have used flexible reciprocating drive wires but these deliver power only under tension.

This construction is inherently inefficient compared to the true reciprocating flexible drive shaft which uses no spring to provide a return stroke.

Cables with equal push-pull capabilities are in common usage, however, these have been for control applications only, not for the transfer of horsepower.

Proportions of length, width, and strength are especially critical for the shaft outside the points of extension for it is here, where the shaft has no lateral support, that it is most likely to be crushed by compressive force. The strength or width requirements grow exponentially with increase of extension length. Fortunately the shaft needs to be extended only as far as the width of the widest branch that it is capable of cutting in one stroke. Given these proportions, today's materials are completely sufficient and economical.

Should a member be inserted that would stop the blades from moving, the motor will stall before the shaft would be crushed or snapped.

The extension points must surround and embrace the shaft in a structural manner for they provide a channel perfectly parallel to the direction of travel of the moving part of the working end and that of the reciprocating power takeoff, regardless of tilt position.

Bridging the extension points is a strong flexible shaft covering. The tolerance between shaft and covering must be exact and small so that the shaft gets utmost lateral support. The innermost portion of the covering must be of a material low in friction to withstand the rubbing of the shaft under rapid machine driven reciprocation, often under loads. This covering must be attached in a continuous or near continuous manner along the boom to lend further lateral support. The hinge must be offset or split to allow unimpeded bending of the shaft as the tilt control moves from position to position.

Like some hedge trimmers, the UVC can be constructed with two counter reciprocating blades as opposed to the single action machine I have described. This design will yield less vibration than the single action layout, since the blades act as counterweights.

The final terminus of the reciprocating drive train is a saw that is removably attached to the end of the moving part of the sickle. It uses no brace to steady material to be cut. The inertia of the material is usually sufficient to prevent material from reciprocating with saw.

This is possible because the saw makes a narrow cut into the wood, pushing and pulling the material slightly, and loading the drive train minimally.

Because of its short stroke, the saw must be manually reciprocated with longer strokes to clear chips. Thus, it cuts in a duo-reciprocating manner not unlike an electric carving knife.

The object of this invention is to provide a means of controlling all forms of standing vegetation, excluding large diameter branches and trunks.

Here, then, is a specific guide to the accompanying drawings (2 sheets):

GUIDE

FIG. 1 is a perspective view showing entire length of the UVC.

FIG. 2 is an end view of the extension point(s) with the clamps omitted for clarity.

FIG. 3 is a perspective view of a variation of the UVC to be used for tree pruning only.

FIG. 4 is a side view of the hinge area of the UVC in the straight position.

FIG. 5 is a top view of hinge area.

FIG. 6 is a side view of motor area with covers removed.

FIG. 7 is a perspective view of the UVC as adapted as an attachment for a universal power plant.

FIG. 8 is a perspective view of the point of extension area of the working end.

FIG. 9 is a perspective view of the area of the points of attachment for saw.

FIG. 10 is a side view of hinge area with UVC in a high horizontal position.

FIG. 11 is a side view of hinge area with UVC in a low horizontal position.

Referring now to FIG. 1, 12 is the boom which is a structural pole to which all other parts are directly or indirectly attached, 13 is the handle locking device, 14 is the reciprocating power take off covering, 15 is the motor, 16 is the reciprocating motion producing gear box, 17 is the handle, 18 is the control rod, 19 is the point of extension, 20 is a clamping device, 21 is the saw attachment, 22 is the reciprocating sickle type cutting blade, 23 is the tilt control hinge, and 24 is the points of attachment for saw.

Referring to FIG. 2, 27 is the drive shaft covering, 32 is an optional ring of wire reinforcement for covering, 31 is the innermost portion of the driveshaft covering, 26 is the reciprocating flexible drive shaft, and 30 is a mounting strap for the point of extension.

Referring to FIG. 3, all parts in this view are mentioned in other views.

Referring to FIG. 4, all parts in this view are mentioned in other views.

Referring to FIG. 5, 29 is an outline of part 20 in the retracted position.

Referring to FIG. 6, 35 is the power end point of extension for the reciprocating drive shaft, 34 is the reciprocating power take off, and 33 is two mounting straps for 16 and 15.

Referring to FIG. 7, 36 is a universal power plant capable of driving several attachments, and 37 is a reciprocating motion producing gearbox.

Referring to FIG. 8, 39 is the non-moving part of the reciprocating sickle-type cutter, 38 is the moving part of said cutter, binding fasteners, and 41 is the binding plate.

I claim:

1. A cutter of standing vegetation having a boom to which is connected at one end a hinge from which projects a reciprocating type sickle, and is suspended centrally from a pivoting handle to which is connected a control rod which runs parallel to the greater length of the boom and is connected in a pivoting fashion to a control lobe which is connected at right angles to the non-moving part of the sickle, and a motor and gearbox assembly which produces reciprocating motion mounted at the other end of the boom, having a reciprocating power-take-off to which is clamped a reciprocating flexible drive shaft which runs to and is clamped upon the moving part of the sickle and is supported, braced, and channeled, by a flexible covering which terminates in two extension points, one of which is near the reciprocating power takeoff, the other of which is near the moving part of the sickle, which terminates in another reciprocating power-take-off to which a detachable saw blade is mounted.

2. A cutter of standing vegetation as in claim 1 except adapted as an attachment to a universal rotating power source which consists of a motor and a rotating drive shaft which runs approximately half the length of the boom and terminates in a rotating power take off which is also the point of attachment for said cutter the reciprocating motion producing gearbox of which is located promptly behind said boom split.

3. A reciprocating sickle type cutter of standing vegetation, to which a detachable saw is mounted on the end of the moving part thereof.

4. A cutter of standing vegetation as in claim 1 except with other type of drive train, retaining configuration of handle control rod, control lobe, hinge, boom and motor.

5. A cutter of standing vegetation as in claim 1 except with a duo-reciprocating sickle type blade using two reciprocating flexible drive shafts.

6. A cutter of standing vegetation as in claim 1 except that sickle and tilt control mechanism have been omitted, to be used for pruning trees exclusively.

* * * * *